Patented Nov. 13, 1945

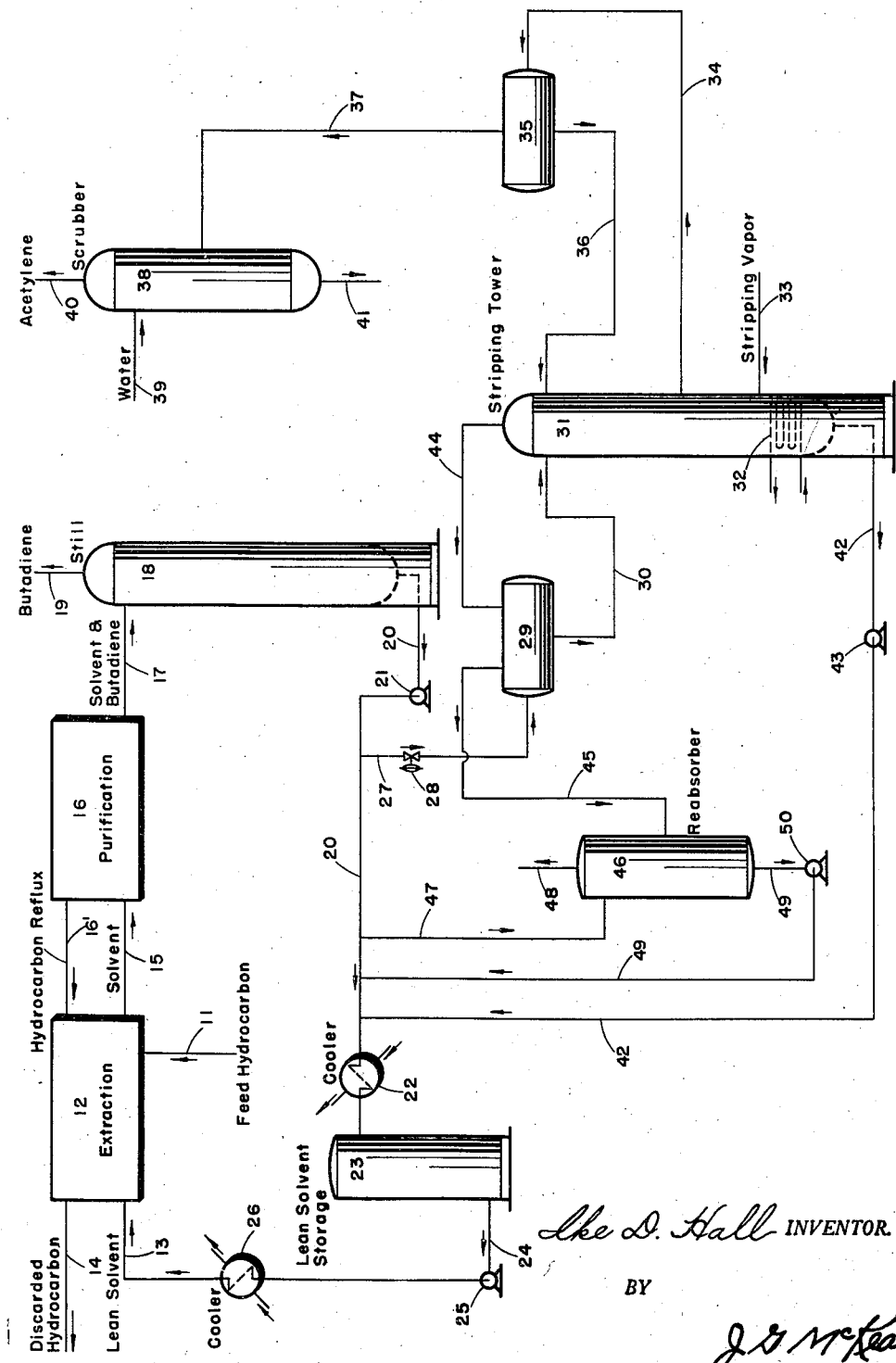

2,388,913

UNITED STATES PATENT OFFICE 2,388,913

SEPARATING ACETYLENES FROM LIGHT HYDROCARBONS

Ike D. Hall, Baytown, Tex., assignor to Standard Oil Development Company, a corporation of Delaware Application May 22, 1944, Serial No. 536,667

7 Claims. (Cl. 260—681.5)

The present invention is directed to a method for removing acetylenes from a solution containing acetylenes and higher molecular weight hydrocarbons of the character of butadiene. In its more specific aspects the present invention is directed to the separation of acetylenes from an aqueous solvent having dissolved therein a diolefin as well as the acetylenes and conducting the operation in such a way that no more than minor amounts of the diolefin are lost from the operation.

It is at present conventional to concentrate diolefins by passing a hydrocarbon feed including a diolefin through an extraction stage where the feed is allowed to come in contact with an aqueous solution capable of selectively absorbing the diolefin. Commercially an aqueous solution of cuprous ammonium acetate is most often used as the solvent, but other solvents, such as water, ammoniacal water, and aqueous solutions of silver nitrate, mercuric cyanide and cuprous chloride, may also be employed for this purpose. It is usual to distill the hydrocarbon in order to segregate a C4 fraction to be fed to the extraction process, but in spite of this preliminary fractionation the hydrocarbon feed stock usually comprises small amounts of acetylenes, such as methyl, ethyl and vinyl acetylenes. The aqueous solution employed for this solvent is selective to the acetylenes as well as the diolefins contained in the feed, so that the rich solvent withdrawn from the extraction step includes both diolefins and acetylenes. This rich solvent is usually passed through a purification step, wherein the solvent is freed of mono-olefins by countercurrent stripping with the diolefins and then the purified rich solvent is sent to a fractionating column for the removal of the diolefin therefrom. The diolefin is more readily desorbed from the aqueous solution than are the acetylenes, so that the vapors removed as overhead from the column may be substantially pure diolefin, while the solvent withdrawn from the column contains substantially all of the acetylenes charged to the column and diolefins which were not vaporized in the column. In order to prevent a progressive increase in the concentration of acetylenes in the solvent and a corresponding increase in the acetylene concentration in the diolefin product, it is necessary to treat the solvent withdrawn from the desorption tower to remove acetylenes therefrom.

It is an object of the present invention to devise a method for stripping acetylenes from a solvent containing acetylenes and diolefins and discarding the acetylenes from the system without the loss of appreciable amounts of diolefins.

Other objects and advantages of the present invention may be seen from the following description taken with the drawing, in which the sole figure is in the form of a diagrammatic flow sheet illustrating one mode for practicing the present invention.

Turning now specifically to the drawing, a hydrocarbon feed stock comprised principally of C4 hydrocarbons, including butadiene and also comprising a minor portion of acetylenes, is charged through inlet line 11 into extraction zone 12. Within the extraction zone the hydrocarbon feed stock is brought into intimate contact with an aqueous solvent, such as cuprous ammonium acetate solution, which is capable of selectively absorbing the butadiene. The lean solvent enters the absorption zone through line 13. Unabsorbed hydrocarbons are removed from zone 12 by line 14 and enriched solvent is removed from the zone through line 15. It is to be understood that, although absorption zone 12 has been shown as a single vessel in the drawing, in practice a number of vessels may be employed and the absorption step may actually include a large number of separate stages to insure effective removal of the diolefins from the hydrocarbon feed stock. The rich solvent is discharged through line 15 into purification zone 16.

Purification zone 16 may comprise a number of stages wherein the solvent is mixed intimately with a liquid hydrocarbon stream containing progressively higher concentrations of the diolefins in each succeeding stage, and where the solvent-hydrocarbon mixture is separated into two phases with the solvent being transferred to the stage of next higher diolefin concentration and the hydrocarbon transferred to the stage of next lower diolefin concentration. In the final stage of zone 16, heat is applied to release a portion of the hydrocarbon which is returned to the preceding stage and serves as the stripping medium which displaces selectively the mono-olefins dissolved in the solvent. A hydrocarbon stream is removed as reflux from zone 16 and returned through line 16' to extraction zone 12.

The rich purified solvent, comprising diolefin and a minor portion of acetylenes, is discharged from zone 16 through line 17 into an upper portion of distilling column 18, which serves as a desorber for the diolefin. Substantially pure diolefin is removed as overhead from tower 18 by outlet 19 and relatively lean solvent is removed as bottoms from the tower by line 20. The major portion of the lean solvent in line 20 is pumped by pump 21 through cooler 22 into an accumulator 23 and from the accumulator it is forced through line 24 by pump 25 to a suitable refrigerating means 26. From the refrigerating means the chilled solvent is returned via line 13 to extraction zone 12.

The lean solvent discharged from desorber 18 through line 20 has present therein substantially all of the acetylenes absorbed by the solvent in the extraction zone because the acetylenes are more strongly retained in the solvent than are the diolefins. In addition to the acetylenes, diolefins are present in the lean solvent. Under normal operating conditions, the percentage of acetylenes present in the lean solvent removed from desorber 18 through line 20 will be of the same order of magnitude as the diolefins present therein. The diolefins retained by the lean solvent represent a minor amount of the hydrocarbon fed to the extraction zone, but it is commercially undesirable to discard this portion of the diolefins from the system. In order to prevent the progressive increase in concentration of the acetylenes in the lean solvent, it is necessary to treat the lean solvent further to remove acetylenes therefrom.

A minor portion of the lean solvent flowing through line 20 is removed through branch line 27, has its pressure reduced by being passed through a pressure release valve 28, and is discharged into flash drum 29. Liquid is removed from flash drum 29 by line 30 and discharged into an upper portion of a stripping column 31. The lower portion of column 31 is provided with a heating coil 32 and a stripping vapor, such as ammonia, is injected into the lower portion of the column via inlet 33.

At the midpoint of stripping tower 31 the vapor composition includes large amounts of the stripping vapors and a relatively large concentration of acetylenes and a substantially lower concentration of diolefins. This vaporous mixture is removed from the tower through line 34 and discharged into a knockout drum 35. Liquids separated from the vapors in drum 35 are returned to the upper portion of column 31 through line 36 and the remaining vapors pass from drum 35 through line 37 and into scrubbing tower 38. The stripping vapor is removed from the vaporous mixture in scrubbing tower 38 by passing a liquid, such as water, capable of absorbing the vapors, into the upper portion of the tower by means of inlet 39 and allowing it to pass downwardly in the tower countercurrent to the vapors. The unabsorbed vapors, consisting principally of acetylenes, are withdrawn from the upper portion of the tower through line 40. The water containing dissolved stripping vapors is withdrawn from the lower portion of scrubbing tower 39 via outlet 41 and passed to a suitable recovery means, not shown.

The solvent in the lower portion of solvent stripping tower 31 has been freed from substantially all of the acetylenes and diolefins that it contained when it was discharged into the upper portion of the tower. This stripped lean solvent may be withdrawn from tower 31 through line 42, containing pump 43, and admixed with the solvent stream flowing through line 20.

Vapors in the upper portion of tower 31 are comprised principally of diolefins and have entrained therein appreciable amounts of solvent. These vapors are removed from tower 31 through line 44 and pass into the upper portion of flash drum 29.

It will be seen that the vapor portion of drum 29 not only contains vapors released from the solvent as it passes through valve 28 and into the drum, but in addition contains the vapors discharged from the upper portion of stripping tower 31. Inasmuch as vapors containing a major portion of the acetylenes are withdrawn from tower 31 by means of line 34, the overhead from tower 31 comprises a major portion of the diolefins which have entered the tower. The diolefin component of the vapors in drum 29 is recovered by passing the vapors through line 45 and into the lower portion of reabsorber 46. Vapors in the reabsorber flow upwardly and are brought into intimate contact with down-flowing lean solvent which is withdrawn from line 20 by line 47 and is passed into the upper portion of the reabsorber tower. Any unabsorbed vapors are withdrawn periodically from the upper portion of the tower through line 48. The solvent accumulating in the bottom of tower 46 has been enriched by absorbing diolefin from the vapors, but it is not a rich solvent in the same sense that the solvent withdrawn from extraction step 12 is considered a rich solvent. In other words, the solvent in the bottom of reabsorber tower 46 is, comparatively speaking, a lean solvent and suitable for use as a lean solvent in absorption step 12. For this reason solvent in the bottom of reabsorber 46 may conveniently be withdrawn through line 49, containing pump 50, and returned to line 20, where it is commingled with the lean solvent being returned to the extraction step carried out in unit 12.

The following pressure and temperature limitations which will be found suitable in operating the process above described are given herein by way of example. When butadiene is being recovered from a vaporous mixture, the extraction zone 12 may be operated at a temperature of the order of 8° F. to form a rich solvent and the rich solvent withdrawn to purification zone where it may be contacted in a plurality of stages of progressively increasing temperature with the temperature of the final stage of the order of 35° F. Desorber zone 18 may be operated under a pressure within the range of 15 to 20 pounds per square inch gauge and a temperature of approximately 80° F. Flash drum 29 may be operated at a pressure within the range of 5 to 10 pounds per square inch gauge and at a temperature within the range of 85 to 90° F. The upper end of stripping tower 31 is in communication with flash drum 29 and accordingly is at approximately the same pressure as the flash drum; it will be found convenient to operate stripping tower 31 with a bottom temperature of the order of 185° F. and a top temperature of 150° F. Reabsorber 46 may be operated at a pressure within the range of 5 to 10 pounds per square inch gauge inasmuch as its pressure is approximately that of flash drum 29 and the top of stripping tower 31; reabsorber 46 may have a top temperature of approximately 90° F. and a bottom temperature of approximately 100° F.

As a specific example illustrating the practice of the present invention, a desorption vessel corresponding to tower 18 was operated under a pressure of 17 pounds gauge to release butadiene from a rich absorption liquid. The absorbent liquid used in this system was an aqueous solution of cuprous ammonium acetate. The lean solvent was withdrawn from the bottom of tower 18 at a rate of 60,000 gallons per hour. From this main stream, 6,000 gallons per hour were withdrawn as a side stream and sent to solvent stripping vessel 31 and 1,500 gallons per hour were withdrawn as a side stream through line 47 and sent to the reabsorber vessel.

The flash drum 29 and solvent stripper 31 were operated at a pressure of approximately 7 pounds per square inch gauge. Vapors withdrawn per hour from the center portion of the solvent stripper included 600 pounds NH₃, 33 pounds acetylenes, 8 pounds butadiene and 180 pounds of water vapors. The vapors discarded per hour by means of line 40 included 30 pounds acetylenes, 8 pounds butadiene, 1 pound water vapor and a trace of NH₃. The vapors removed from flash drum 29 and sent to reabsorber 46 where they were substantially all reabsorbed included the following amounts, per hour: 90 pounds NH₃, 6 pounds acetylenes, 54 pounds butadiene and 20 pounds water vapors. It will be seen that from the 6,000 gallons per hour of lean solvent treated in solvent stripper 31 a total of 39 pounds of acetylenes and 62 pounds of butadiene were released, and of the acetylenes released 30 pounds were discarded from the system, while of the butadiene released 54 pounds were recovered.

In the example given the bottom of tower 31 was maintained at a temperature of 185° F., its top at 150° F. and the center portion, from which the side stream was withdrawn, was at 170° F. Reabsorber 46 was maintained at a temperature of approximately 90° F., as was scrubbing tower 38.

Having fully described and illustrated the practice of the present invention, what I desire to claim is:

1. In an absorption system wherein a rich aqueous solvent having dissolved therein diolefins and acetylenes is obtained, the steps of subjecting the rich solvent to fractional distillation to recover the major portion of the diolefin therefrom and obtain a relatively lean solvent, subjecting at least a portion of the relatively lean solvent to a second step of distillation under a pressure substantially below that at which the first distillation was conducted, removing from the second distillation step a first fraction comprising a major portion of acetylenes and a minor portion of diolefins, removing from the second distillation step a second fraction comprising a major portion of diolefins and a minor amount of acetylenes, and recovering substantially all of the diolefins from the second fraction by bringing them into intimate contact with a liquid capable of absorbing them.

2. A method for treating a solvent liquid having dissolved therein a major portion of diolefins and a minor portion of acetylenes comprising the steps of fractionally distilling said solvent liquid to recover therefrom a major portion of the diolefins in vaporous condition, removing from the fractionating step a relatively lean solvent having dissolved therein acetylenes and diolefins in substantially equal portions, dividing from the withdrawn relatively lean solvent a first stream and a second stream and subjecting said first stream to a stripping action to separate therefrom a first vaporous fraction comprising a major portion of actylenes and a minor portion of diolefin and a second vaporous fraction comprising a minor portion of acetylenes and a major portion of diolefin, discharging at least the major portion of the second vaporous fraction into an absorption zone, discharging said second stream into the absorption zone to contact it intimately with the vapors discharged therein to dissolve substantially all of said vapors in the liquid, withdrawing the resulting liquid from the absorption zone and commingling it with the remaining lean solvent withdrawn from the first mentioned fractionating step.

3. In an extraction process wherein a stream of lean solvent is brought into intimate contact with a stream of hydrocarbons comprising diolefins and acetylenes to form a rich solvent having dissolved therein major portions of diolefins and minor portions of acetylenes, a method for treating the rich solvent comprising the steps of subjecting said rich solvent to a distillation step to remove a major portion of the diolefins therefrom as vapors, removing solvent containing the remaining diolefins and acetylenes from the distillation step, separating therefrom a first portion and a second portion, subjecting said first portion to a stripping step to remove a first vaporous fraction comprising a major portion of acetylenes and a minor portion of diolefin and a second vaporous fraction comprising a major portion of diolefin and a minor portion of acetylenes therefrom, employing said second portion as absorbent liquid in an absorption zone, passing the second vaporous fraction withdrawn from the stripping zone to said absorption zone and flowing it countercurrently to the absorbent liquid to dissolve substantially all of the vapors therein, withdrawing the resulting liquid from the absorption zone, withdrawing the remaining liquid from the stripping zone and commingling these liquid fractions with the remaining solvent withdrawn from the distillation step to form the lean solvent employed for extracting the diolefins from the hydrocarbon mixture.

4. A method in accordance with claim 3 in which the distillation step is conducted at a pressure ranging from 15 to 20 pounds per square inch gauge and the stripping step is conducted at a pressure ranging from 5 to 10 pounds per square inch gauge.

5. A method for recovering hydrocarbons comprising the steps of contacting a hydrocarbon mixture comprising butadiene and a minor portion of acetylenes with an aqueous solution of cuprous ammonium acetate in a first absorption zone at approximately 8° F. to form a rich solvent, withdrawing the rich solvent from the first absorption zone and concentrating butadiene therein in a purification zone, withdrawing said rich solvent from said zone in which the butadiene is concentrated to a first distillation zone maintained under a pressure ranging from 15 to 20 pounds per square inch gauge and distilling to remove an overhead fraction comprising substantially pure butadiene, withdrawing a stream from the first distillation zone having dissolved therein substantially equal portions of butadiene and acetylenes, splitting off from the stream a first side stream and a second side stream, subjecting said first side stream to stripping in a stripping zone under pressure substantially below the pressure in the distillation zone to separate a first vaporous fraction comprising a major portion of acetylenes and a minor portion of butadiene and a second vaporous fraction comprising a major portion of butadiene and a minor portion of acetylenes, discarding the first vaporous fraction, sending at least a major portion of the second vaporous fraction to a second absorption zone, employing said second side stream as the absorbent liquid in the second absorption zone, causing vapor to flow countercurrently to the absorbent liquid in the second absorption zone to dissolve substantially all of the vapor in the absorbent liquid, withdrawing the resulting liquid from the second absorption zone, withdrawing stripped liquid from the stripping zone and commingling them with the remaining portion of the stream withdrawn from the first distillation zone, chilling the resultant stream and employing it as the aqueous cuprous ammonium acetate in the first absorption zone.

6. A method in accordance with claim 5 in which the stripping zone is maintained at a pressure ranging from 5 to 10 pounds gauge with a bottom temperature of 185° F., a top temperature of 150° F. and in which the second absorption zone is maintained at a temperature of 90° F. and in which the second side stream is approximately ¼ the size of the first side stream.

7. A method in accordance with claim 5 in which the first side stream is sent to a flashing zone and liquid from the flashing zone is sent to the stripping zone, and in which the second vaporous fraction is discharged into the upper portion of the flashing zone and the vapors from the flashing zone are sent to the second absorption zone.

IKE D. HALL.